Feb. 27, 1940.  H. SCHLACHTER  2,191,865
MECHANICAL MOVEMENT
Filed April 22, 1936  3 Sheets-Sheet 1

Inventor
HENRY SCHLACHTER
By Semmes & Semmes
Attorneys

Feb. 27, 1940.  H. SCHLACHTER  2,191,865
MECHANICAL MOVEMENT
Filed April 22, 1936  3 Sheets-Sheet 2
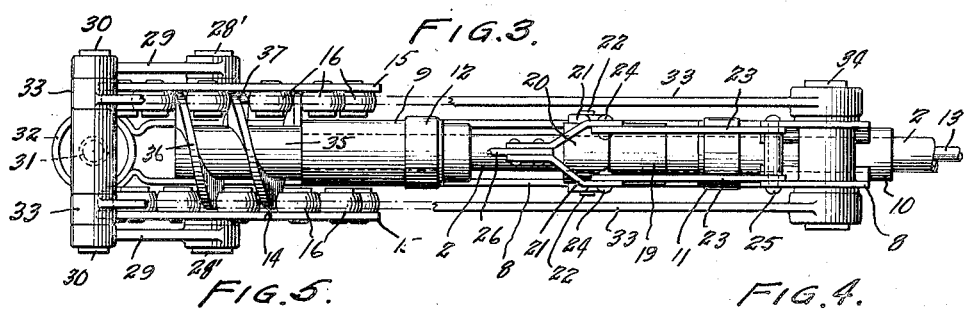
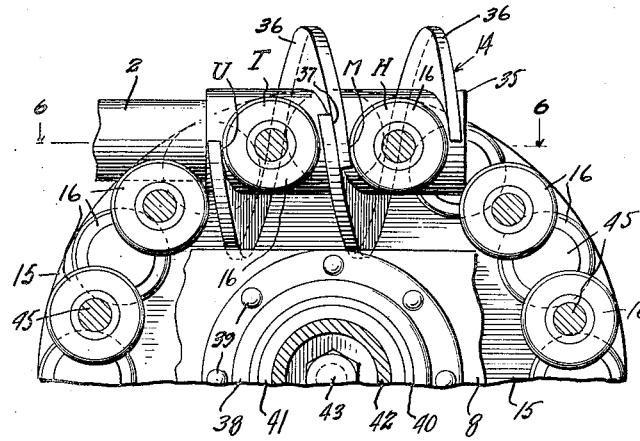
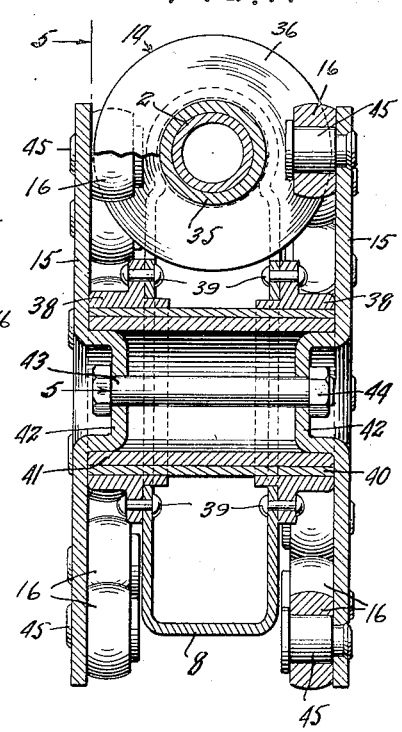
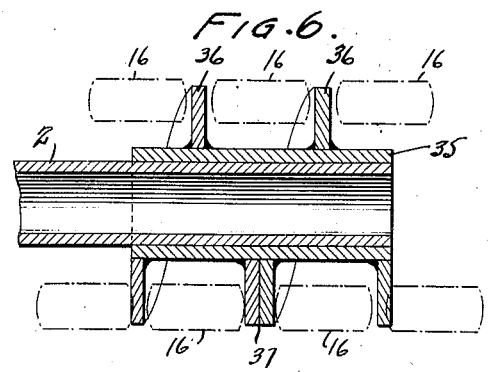
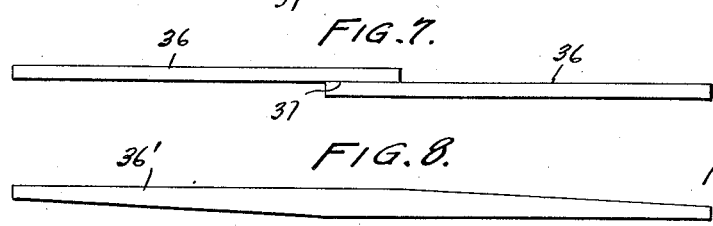
Inventor
HENRY SCHLACHTER
By Semmes & Semmes
Attorneys Feb. 27, 1940.  H. SCHLACHTER  2,191,865
MECHANICAL MOVEMENT
Filed April 22, 1936   3 Sheets-Sheet 3

Inventor
HENRY SCHLACHTER
By Semmes & Semmes
Attorneys

Patented Feb. 27, 1940

2,191,865

UNITED STATES PATENT OFFICE 2,191,865

MECHANICAL MOVEMENT

Henry Schlachter, Beatrice, Nebr.

Application April 22, 1936, Serial No. 75,807

2 Claims. (Cl. 74—424.7)

This invention relates to a mechanical movement, and more particularly pertains to a worm and roller speed reducing mechanism. While I have shown my device as used for converting rotary motion into reciprocatory movement, it will be appreciated that the mechanism is capable of greater application.

Worm and roller speed reducing mechanisms have heretofore been used, but they have presented objectionable features. Some of the prior devices have used a double thread worm, which produces so much variation in the relative angular velocity of the driven discs that they have no utility. While it is not possible to entirely eliminate this variation, it can be reduced to usable limits by proper design.

Another feature which is present in the prior devices using a single thread worm is the objectionable back lash, and most of these devices will not work unless a great amount of back lash is permitted.

I have found that this back lash can be overcome in two ways; first, by having the thread on the worm of varying thickness, and second, by making the thread in two pieces.

An important object of my invention is a speed reducing mechanism which lacks the objectionable characteristics of the prior devices.

Another object of my invention is a mechanical movement which is compact, rugged and efficient.

Yet another object of my invention is a worm and roller reduction mechanism which reduces back lash to a minimum.

Still another object of my invention is to provide a worm and roller reduction mechanism in which the thread on the worm is of varying thickness.

A further object of my invention is to provide a worm and roller reduction mechanism which has a minimum of variation in the angular velocity of the driven discs.

A still further object of my invention is a worm and roller reduction mechanism in which one revolution of the worm will move the discs carrying the rollers an equal distance.

Yet a further object of my invention is a worm and roller reduction unit in which the thread on the worm is made in two pieces.

Another object of my invention is the use of a worm and roller speed reduction mechanism for converting rotary motion into reciprocatory movement.

With these and other objects in view, which may be incident to my improvements, the invention consists in the parts and combinations to be hereinafter set forth and claimed, with the understanding that the several necessary elements comprising my invention may be varied in construction, proportions and arrangement, without departing from the spirit and scope of the appended claims.

In order to make my invention more clearly understood, I have shown in the accompanying drawings means for carrying the same into practical effect without limiting the improvements in their useful applications to the particular constructions which, for the purpose of explanation, have been made the subject of illustration.

In the drawings:

Figure 3 is a fragmentary top view of the structure shown in Figure 2.

Figure 4 is a view taken along the line 4—4 of Figure 2, looking in the direction of the arrows.

Figure 5 is a view taken along the line 5—5 of Figure 4, looking in the direction of the arrows.

Figure 6 is a view taken along the line 6—6 of Figure 5, looking in the direction of the arrows.

Figure 7 shows the thread on the worm when constructed of two pieces.

Figure 8 shows the thread of the worm when made of varying thickness.

Figure 1:
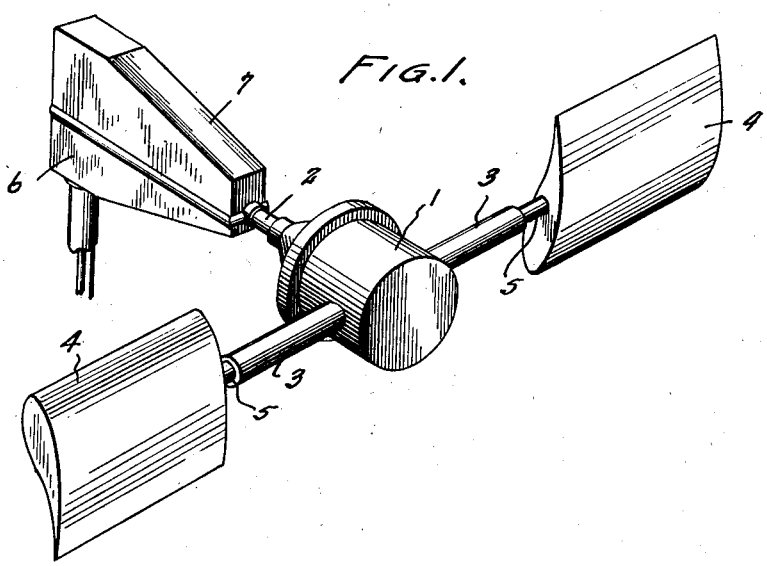
Figure 1 is a view in perspective showing a wind wheel.

Referring to the drawings, in which like numerals designate similar parts, and particularly to Figure 1, there is shown a windmill, the working parts of which are more fully described in my Patent No. 2,029,674, having a hub 1 which is composed of two parts. The hub parts are detachably secured together so as to permit access to the mechanism on the interior thereof. A drive shaft 2 is secured to one of the hub parts. It will be readily appreciated that the movement of the wind wheel is thus communicated to the drive shaft.

Radial tubes 3 pass through one of the hub parts and are permanently secured thereto, as by brazing or welding. The wind wheel itself consists of a plurality of blades 4. The blades are secured to stems 5 which are slidable and/or rotatable in the tubes 3. The hub 1 is adapted for connection with the drive shaft 2 of the motor. The motor is enclosed within a casing 6 having a hood 7 for protecting the motor mechanism from injury.

Figure 2:
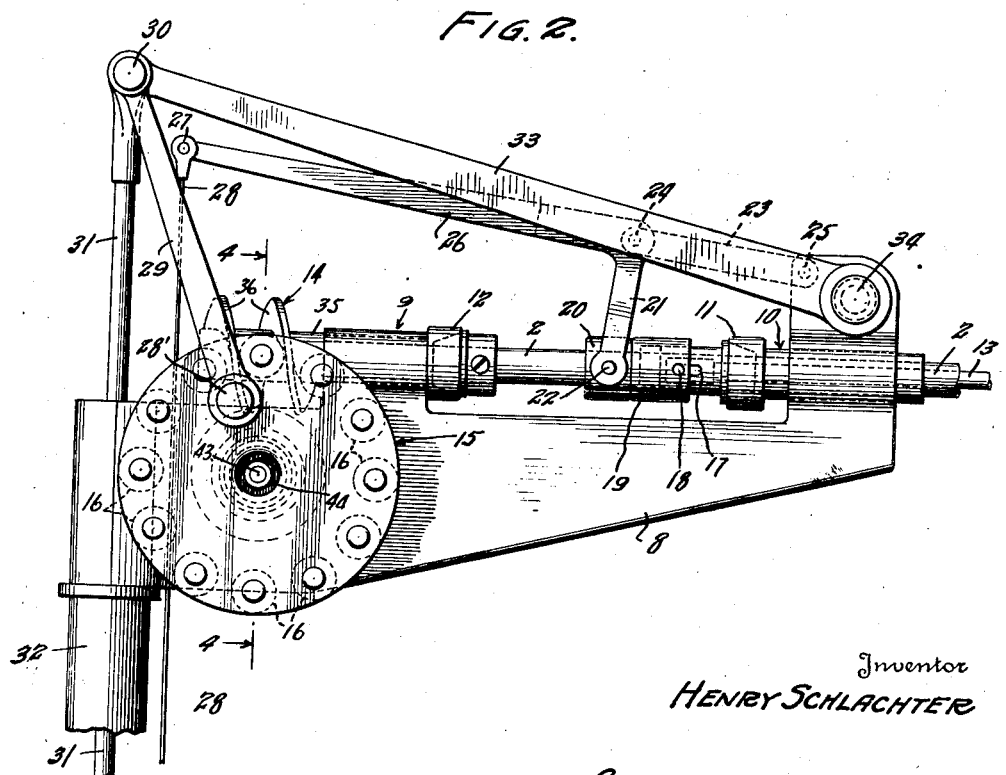
Figure 2 is a side elevation showing my reduction unit used in conjunction with a reciprocating pump.

The motor mechanism is best shown in Figures 2 and 3. A framework 8 having aligned journal members 9 and 10 is provided for supporting the drive shaft 2. The shaft 2 is provided with thrust bearings 11 and 12 at the front and rear ends, respectively. A rod 13 is mounted within the shaft 2 with which it may rotate, but it is mounted in the shaft so that it is slidable relative thereto. The rear end of the drive shaft 2 is provided with a worm designated generally 14. The worm is adapted to transmit power to a pair of discs 15 mounted on each side of the worm and having rollers 16. The worm and roller assembly will be hereinafter described more fully.

The drive shaft 2 is provided with a slot 17 which is adapted to receive a pin 18 projecting from the rod 13 and extending through a collar 19. The collar 19 is adapted to rotate with the shaft 2 and with the rod 13, and is slidable with the rod relative to the shaft. Adjacent the collar 19 and positioned in the rear thereof is a second collar 20 which is non-rotatable. The collar 20, however, is slidable in a lengthwise direction with respect to the shaft 2. A split bell crank lever 21 is fitted over the collar 20 and is pivotally secured thereto by means of a pin or the like 22. A pair of links 23 are pivotally secured to the bell crank 21 as at 24 and are also pivotally connected to the frame 8 at 25. The bell crank 21 is part of the lever 26, which is provided with a pivotal connection 27 at its rear extremity for receiving a pull-out wire 28. It will be appreciated that the purpose of the foregoing construction is of course to provide a mechanism for throwing the mill into and out of operative position. Depressing the rear end of the lever 26 will cause the forward movement of the rod 13 relative to the shaft 2 and thereby throw the mechanism out of gear, as fully described in my Patent No. 2,029,674.

The discs 15 are driven by the worm 14. Eccentrically mounted on the disc members as at 28' are a pair of pitman arms 29. A wrist pin 30 connects the pitman arms to a reciprocating pump rod 31 which is housed within a tubular casing 32. A second pair of links 33 is also connected to the pump rod by means of the wrist pin 30. The other ends of the links are pivotally connected to the frame 8 as shown at 34. It is believed obvious from the foregoing that, when the drive shaft 2 is rotated through the action of the wind on the blades 4, the rotary motion will be transmitted through the worm 14 to the disc and roller reduction unit, where it will finally be converted into an up and down movement of the pump rod 31.

Referring to Figures 4 and 5, I have shown more fully my novel worm and roller reduction unit. As has been heretofore pointed out, the prior mechanisms have not been very efficient or practical. Some of these units have used a double thread worm. Such a mechanism produces so much variation in the relative angular velocity of the driven discs that the device has little or no utility. While it is not possible to completely eliminate this variation, it can be reduced to usable limits. Even with those devices which use a single thread worm, there is so much back lash that the units cannot be used unless excessive back lash is permitted.

As clearly shown in Figure 5, the worm 14 consists of a worm hub 35 which is secured to the drive shaft. The thread 36 provided on the hub is preferably made of two pieces (see Figure 7), which may be secured together as shown at 37, but separate pieces held adjacent each other may be employed. I have shown a thread of about two and a half revolutions which actually forms a groove of one turn, either wall of which may be a driving face. This will of course depend on the load and the direction of rotation. To extend the groove beyond one turn will only cause trouble, in view of the fact that not more than one roller on each disc can be kept in contact with the worm, as will hereinafter become apparent. As heretofore pointed out, such a thread will permit little or no back lash.

Instead of making the thread 36 of two pieces, there is shown in Figure 8 another form of thread 36' which may be used. This thread is a single piece; the faces opposite the working faces must be cut away as shown.

In the event that the thread is of uniform thickness and is not provided with relieved portions opposite the working faces, and even if the groove is of but a single turn, it could not be turned. This is due to the fact that the roller would bind when moving from one working face to the other.

The working surfaces of the worm are hardened and they are of sufficient thickness to support the load without excessive flexure.

Positioned on opposite sides of the worm are discs designated 15. Flanged collars 38 are secured to the frame 8 by means of rivets 39. A bushing 40 is provided in the collars 38 and a sleeve 41 which is of sufficient length to hold the discs 15 apart at the proper distance fits inside the bushing. The discs 15 are provided with a central boss 42 which fits snugly within the sleeve 41. A bolt 43 having nut 44 fits through aligned apertures in the bosses for holding the discs together. The bolt 43 is pulled up snugly, but not tightly, so that the discs can have a certain amount of movement relative to each other. This is important, for if the discs were rigidly bound together, the load would be carried most of the time by one roller on one disc instead of one roller on each disc.

Mounted on each disc is an annular series of rollers 16. The rollers 16 are secured to the discs by means of rivets or the like 45. As the rollers move vertically as well as axially with respect to the worm, line contact on the surface of the roller is impossible (except instantaneously). Therefore, the faces of the rollers are preferably rounded, so that contact between the roller and the worm will take place as nearly as possible to the center of the roller. This will tend to avoid eccentric loading of the roller journal, and thereby increase its durability.

Referring to Figure 5, it will be seen that roller T is in contact with surface U of the worm, while roller H is in contact with surface M of the worm, so that, when M rolls off of roller H, there will be no objectionable shock, since U is already in contact with roller T which now is carrying all the load.

Figure 9:
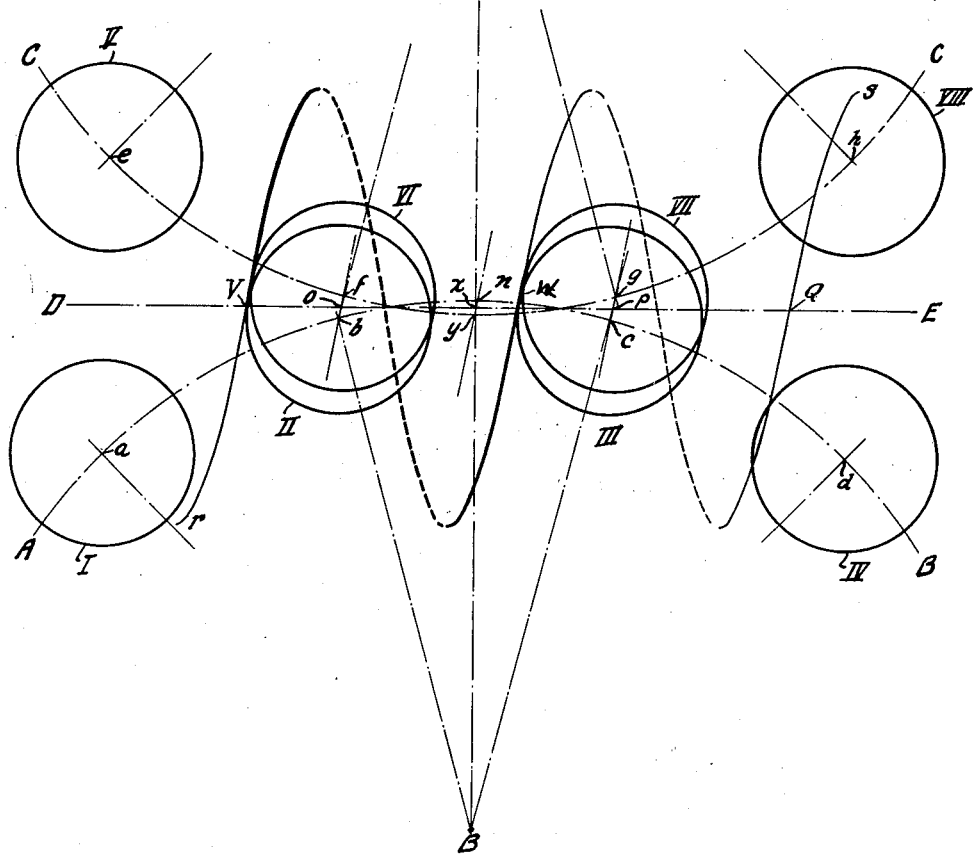
Figure 9 is a diagrammatical view showing the distances traversed by the rollers on the discs.

In Figure 9 is shown a diagrammatic representation of the essential elements of my device in order to more clearly show their geometrical properties or characteristics. This figure is of course hypothetical, and it merely serves to show the distances traversed by the rollers on the respective discs. In this figure, the arc A is part of the circle on which the rollers 16 operate on one of the discs 15. There are shown four rollers on this disc, but I have found that the employment of twelve rollers on each disc affords excellent results. This arrangement will give a reduction of twelve to one, and places the rollers 30° apart on each disc.

The point B is the center of the disc carrying the rollers on the arc A. I have rotated the opposite disc 180° about the axis of the worm shaft for the purpose of more clearly explaining the simultaneous action of the rollers on both discs. The roller circle on this disc is indicated by the arc C. The arcs A and C are laid off with radii as shown, which is determined by the ratio desired and by the dimensions of the parts necessary to carry the desired load. Moreover, after the radius is determined, the exact distance between the axis of the worm and the axis of the disc makes little difference, between rather wide limits.

Assume this distance to be six inches, i. e. the distance between the axis of the worm and the axis of the disc, and the radius of the roller circle to be six and three thirty-seconds inches However, this distance could be increased or decreased by one-eighth inch without affecting the operation in any way. It will be readily appreciated that this is a very important factor from a standpoint of manufacturing.

As heretofore pointed out, the rollers 16 are 30° apart on the roller circle. If we call this angle $\alpha$ and the radius of the roller circle $r$, the distance between the roller centers is 2 x the radius x sin $$\frac{\alpha}{2}$$

which in this instance is 3.154 inches. This distance is substantially equal to the lead of the worm.

One-half of this distance, or 1.577 inches, is laid out on each side of the point $x$ on the line D, E, thereby giving the points $o$ and $p$. The worm has a pitch diameter of five inches. The lead is 3.154 inches, so that the helix angle $\beta$ is determined by the $$\tan \beta = \frac{L}{\pi d}$$

or the tan $\beta$ is equal to $$\frac{3.154}{5\pi}$$

equals .201, or, in this case, $\beta$ equals 11.4°.

The lines $b, f$ and $c, g$ are then drawn through the points $o$ and $p$ at an angle of 11.4° to the vertical. These lines intersect the arcs A and C at $b, c, f$ and $g$, respectively. The circles (rollers) II, III, VI and VII are thus located accurately enough for practical purposes and it is quite obvious that from these points the others can be easily located.

The line $y, n$ is drawn through the point $x$ parallel to the lines $b, f$ and $c, g$. Then if the point $b$ is the center of the roller II on the arc A on one of the discs at the start of a revolution of the worm, it will move to the point $n$ in one-half a revolution and will move to the point $c$ at the end of a revolution. The point $f$, which is the center of the roller VI on the arc C, likewise moves to the point $y$ in one-half revolution and to the point $g$ in a complete revolution of the worm.

It will be appreciated that the arc $f, y$ is equal to the arc $n, c$ and that the arc $b, n$ is equal to the arc $y, g$. It is believed apparent that the arc $f, y$ is shorter than the arc $b, n$. These arcs, that is, $f, y$ and $b, n$, are the paths of the centers of the rollers VI and II, respectively, during one-half revolution of the worm.

During the next one-half revolution of the worm, the discs will move distances corresponding to the arcs $n, c$ and $f, y$, respectively. Inasmuch as these arcs are equal, the discs have again moved in equal distance. Therefore, as the discs have moved an equal distance during each one-half revolution of the worm, one revolution of the worm will move both discs an equal distance.

The foregoing description has assumed a single groove worm, the driving face of which is represented by a development of the pitch line, the curve $r, s$. There are shown about two and one-half revolutions of this helical pitch line, of which one turn, $v$ to $w$, is shown heavily in solid and broken lines to represent the useful portion of the helix, the remainder, $w$ to $z$, being a light broken and solid line.

The helix $v$ to $w$ actually forms one wall of a groove of one turn, either wall of which may be a driving face, depending of course upon the load and the direction of rotation. It might be well to point out that extending this groove beyond one turn will only cause difficulty, as it is evident that not more than one roller on each disc can be kept in contact with the worm.

The advantages of my mechanism are believed to be readily apparent, from the foregoing. The device is compact, rugged and efficient. Spur or bevel gears of the same strength and ratio would be much larger, and would require greater accuracy in mounting, manufacture, etc. Moreover, the design of the worm and rollers reduces the variation in the angular velocity of the driven discs to usable limits. In addition, by having the thread of the worm of varying thickness or made in two pieces, objectionable back lash is eliminated.

Figure 10:
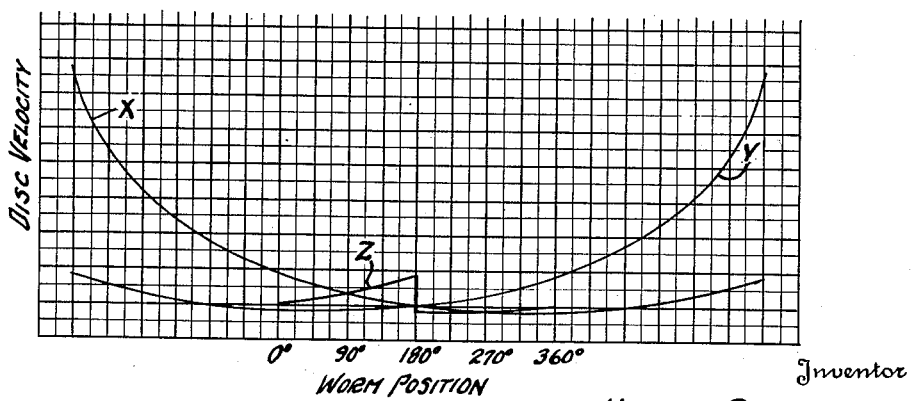
Figure 10 is a graph showing the angular velocity of the discs for a single groove worm.

In Figure 10 there is shown a graph of the angular velocity of the discs for a single groove worm. The curves were prepared by laying off the angular velocities of the discs as ordinates, and the angular movements of the worm as abscissa. If the disc carrying the rollers on the arc A had only one roller on it, and the worm had a single groove of several turns, uniform rotation of the worm would cause rotation of the disc at an angular velocity corresponding to the ordinates of the curve X. This curve covers two and one-half turns of the worm, and it is apparent that the angular velocity of the disc is nearly twice as great at the beginning as it is later.

This variation in angular velocity of the disc makes it impossible to maintain contact between the worm and more than one roller at a time. Therefore, the use of more than one turn of the worm groove would only cause interference or necessitate excessive clearance. The angular velocity of a roller on the disc represented by the arc C is shown by the curve Y. Inasmuch as this disc is substantially 180° out of phase with the disc represented by A, I have taken 360° of the curve Y and transposed the two halves of it and obtained the curve Z. The variation between the curves X and Z is the difference in angular velocity between the discs represented by arcs A and C, respectively, at any instant.

The abrupt offset in the curve Z represents the change in angular velocity when the worm changes contact from one roller to the next. It can readily be seen that the velocity increases at this point on the disc designated by the arc A while it decreases on the disc shown by C.

It will be appreciated that I have devised a worm and roller speed reducing mechanism which is well adapted for converting rotary motion into reciprocatory movement. My device is particularly efficacious when it is used as gearing in a windmill. As heretofore pointed out, the device is compact and efficient and is considerably smaller than other types of gearing of the strength and ratio. Moreover, the mechanism can be either assembled or disassembled in a minimum time.

By my device, the variation in the angular velocity of the driven discs, while not entirely eliminated, is reduced to usable limits. Furthermore, by having the thread on the worm of varying thickness or made of two pieces, objectionable back lash is eliminated.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. In a mechanical movement, a worm of uniform pitch having a thread with axially offset sections forming a groove of uniform width, discs arranged on opposite sides of the worm and having movement relative to each other, contact elements carried by said discs and adapted to travel in said groove, and the contact between the worm and each contact element being substantially perpendicular to the axis of the contact element.

2. In a mechanical movement, a worm of uniform pitch having a thread with axially offset sections forming a groove of uniform width, discs arranged on opposite sides of the worm and having movement relative to each other, rollers carried by each disc, the distance between the centers of the rollers on each disc being substantially equal to the lead of the worm, said rollers being adapted to travel in the groove and as one of the rollers leaves the groove, another is already working in the groove.

HENRY SCHLACHTER.